US008718897B2

(12) United States Patent
Wright et al.

(10) Patent No.: US 8,718,897 B2
(45) Date of Patent: May 6, 2014

(54) VEHICLE DYNAMICS CONTROL IN ELECTRIC DRIVE VEHICLES

(75) Inventors: Ian Wright, Woodside, CA (US); Ryan Cash, Sunnyvale, CA (US)

(73) Assignee: Wrightspeed, Inc., San Jose, CA (US)

( * ) Notice: Subject to any disclaimer, the term of this patent is extended or adjusted under 35 U.S.C. 154(b) by 0 days.

(21) Appl. No.: 13/071,356

(22) Filed: Mar. 24, 2011

(65) Prior Publication Data

US 2011/0238251 A1 Sep. 29, 2011

Related U.S. Application Data

(60) Provisional application No. 61/341,337, filed on Mar. 29, 2010.

(51) Int. Cl.
*B60L 3/10* (2006.01)
*B60L 15/20* (2006.01)
*B60W 50/08* (2012.01)
*B60K 7/00* (2006.01)

(52) U.S. Cl.
CPC .......... *B60L 3/102* (2013.01); *B60L 15/20* (2013.01); *B60L 2220/44* (2013.01); *B60L 2220/46* (2013.01); *B60L 2240/461* (2013.01); *B60L 2240/465* (2013.01); *B60W 50/087* (2013.01); *B60W 2520/26* (2013.01); *B60W 2720/26* (2013.01); *B60K 7/0007* (2013.01)
USPC .......... 701/89; 701/22; 701/90; 701/91; 180/65.51; 180/65.6; 180/65.7; 180/69.6; 180/233; 180/242; 180/246; 180/197

(58) Field of Classification Search
USPC .......... 701/22; 180/6.48, 65.1, 65.51, 197
IPC .......... B60L 15/10,15/20; B60K 7/00, 26/00, B60K 26/02; H02P 5/46
See application file for complete search history.

(56) References Cited

U.S. PATENT DOCUMENTS

| 6,526,334 | B1 * | 2/2003 | Latarnik et al. ........... 701/1 |
| 7,162,333 | B2 * | 1/2007 | Koibuchi et al. ........... 701/1 |
| 7,263,458 | B2 * | 8/2007 | Hall et al. ........... 702/138 |
| 7,287,612 | B2 * | 10/2007 | Tarasinski et al. ........... 180/65.7 |
| 7,327,242 | B2 * | 2/2008 | Holloway et al. ........... 340/439 |
| 7,386,379 | B2 * | 6/2008 | Naik et al. ........... 701/41 |
| 7,440,834 | B2 * | 10/2008 | Yamaguchi et al. ........... 701/69 |
| 7,610,127 | B2 * | 10/2009 | D'Silva et al. ........... 701/33.9 |

(Continued)

OTHER PUBLICATIONS

Pusca et al. "Modeling and Simulation of a Traction Control Algorithm for an Electric Vehicle with Four Separate Wheel Drives", 2002 Vehicular Technology Conference Proceedings, vol. 3, Fall 2002, pp. 1671-1675.*

(Continued)

*Primary Examiner* — John R Olszewski
*Assistant Examiner* — Todd Melton
(74) *Attorney, Agent, or Firm* — Fenwick & West LLP

(57) ABSTRACT

Embodiments of the invention are directed toward a geared traction drive system configured to drive a wheel of a vehicle, comprising: a driveshaft for transmitting power to the wheel; an electric drive motor for driving the driveshaft, the electric drive motor configured to receive signals from a vehicle dynamic control system to command a required speed; a gear reduction component for reducing the speed of the motor by a predetermined factor to a lower speed suitable for driving the wheel; and a drive electronics component that works with the electric drive motor to drive the wheel to the speed commanded by the vehicle dynamic control system.

41 Claims, 3 Drawing Sheets

(56) References Cited

U.S. PATENT DOCUMENTS

| | | | | |
|---|---|---|---|---|
| 7,885,750 | B2* | 2/2011 | Lu | 701/90 |
| 7,958,960 | B2* | 6/2011 | Mizutani et al. | 180/65.51 |
| 2005/0045392 | A1* | 3/2005 | Maslov et al. | 180/65.5 |
| 2009/0179745 | A1* | 7/2009 | Okamoto et al. | 340/425.5 |
| 2010/0017128 | A1* | 1/2010 | Zeng | 701/301 |

OTHER PUBLICATIONS

Rajamani et al. "Algorithms for Real-Time Estimation of Individual Wheel Tire-Road Friction Coefficients," Proceedings of the 2006 American Control Conference, Jun. 2006, pp. 4682-4687.*

Goodarzi et al. "Design of a VDC System for All-Wheel Independent Drive Vehicles", IEEE/ASME Transactions on Mechatronics, vol. 12 No. 6, Dec. 2007, pp. 632-639.*

Li et al. "On the Vehicle Stability Control for Electric Vehicle Based on Control Allocation", IEEE Vehicle Power and Propulsion Conference, Sep. 2008, pp. 1-6.*

Selim Solmaz; "A Methodology for Design of Robust Rollover Prevention Controllers for Automotive Veh.: Part 1—Differential Braking," Hamilton Inst., Dec. 2006, pp. 1739-1744.

Daegun Hong; "Development of a Vehicle Stability Control System Using Brake-by-Wire Actuators," Journal of Dynamic Systems, Jan. 2008 (vol. 130).

Carlos Canudasde-Wit; "Observers for Tire/Road Contact Friction using only Wheel Angular Velocity Information," Dept. of Mech. Engineering Univ. Cal. Dec. 1999, pp. 3932-3937.

H. Ebrahimirad; "Sliding Mode Four Wheel Slip-Ratio Control of Anti-lock Braking Systems," 2004 IEEE Int'l Conf. on Industrial Technology, pp. 1602-1606.

Daegun Hong, "Wheel Slip Control Systems Utilizing the Estimated Tire Force," 2006 American Control Conf., Minneapolis, MN, Jun. 2006; pp. 5873-5878.

M.C. Best, "The Identifying Extended Kalman Filter: Parametric System Identification of a Vehicle Handling Model," Proc. IMechE vol. 221 Part K: J. Multi-Body Dynamics, 2007.

Liu et al. "Target Slip Tracking Using Gain-Scheduling for Antilock Braking Systems", Proceedings of the American Control Conference, vol. 2, Jun. 1995, pp. 1178-1182.

* cited by examiner

VEHICLE DYNAMICS CONTROL IN ELECTRIC DRIVE VEHICLES

REFERENCE TO RELATED APPLICATIONS

This application claims priority to U.S. Provisional Patent Application No. 61/341,337, filed Mar. 29, 2010, which is incorporated herein by reference in its entirety.

TECHNICAL FIELD

The present invention relates generally to vehicle dynamics, and more particularly, some embodiments relate to vehicle dynamics control in electric drive vehicles.

DESCRIPTION OF THE RELATED ART

Existing control systems for vehicle dynamics include Electronic Stability Control, Traction Control, and Anti-Lock Braking. Such systems rely on accelerometers for yaw rate sensing, wheel speed sensors, steering wheel position sensors, and other sensors. Control is exercised over engine power, and brakes may be automatically applied and released on each wheel independently. Some systems allowing "torque vectoring" whereby drive torque from the engine may be directed more to one output shaft of a differential than to the other.

In existing systems, a form of exception-based closed-loop control is used, where the traction control, ABS, and stability control programs do not intervene (i.e., do not modify or control the steering, braking, or power delivery systems) until an anomaly is detected, such as a sudden change in wheel speed or yaw rate. Then, the control system intervenes, applying or releasing individual wheel brakes, reducing engine power, and in some cases, vectoring drive torque towards specific wheels, until the anomaly disappears.

BRIEF SUMMARY OF EMBODIMENTS OF THE INVENTION

According to various embodiments of the invention, a geared traction drive system configured to drive a wheel of a vehicle, comprising: a driveshaft for transmitting power to the wheel; an electric drive motor for driving the driveshaft, the electric drive motor configured to receive signals from a vehicle dynamic control system to command a required speed; a gear reduction component for reducing the speed of the motor by a predetermined factor to a lower speed suitable for driving the wheel; and a drive electronics component that works with the electric drive motor to drive the wheel to the speed commanded by the vehicle dynamic control system. The vehicle dynamic control system includes a non-transitory computer readable medium having computer executable program code embodied thereon, the computer executable program code configured to receive sensor inputs, calculate a required wheel speed, and send appropriate signals to the electric drive motor to command the required wheel speed.

In some embodiments, the program code may be further configured to use the received sensor inputs to calculate friction coefficients, slip rates and angles, velocity vectors and resultant wheel motor speed and torque commands. In some configurations, the electric drive motor delivers torque to the wheel with precise vehicle dynamics control including stability, regenerative braking, and traction control. The gear reduction component is configured to reduce the speed of the motor by a predetermined factor to a lower speed suitable for driving the wheel, while the gear reduction component is configured to increase the torque of the wheel by the same predetermined factor. According to some embodiments, the gear reduction component comprises a multiple speed (e.g., 2-speed) design. The vehicle dynamic control system includes a main control processor comprising a dedicated general purpose microcomputer with flash memory main storage, RAM, and communications ports to interface to various driver controls and system components.

According to the above-described system, the vehicle dynamic control system receives inputs from the driver controls and a velocity vector sensor, which measures the speed and direction of the vehicle over the roads. In some implementations, the velocity vector sensor comprises a module including a CCD camera chip and lens, MEMS accelerometers, and a DSP for image processing. The driver controls may include a steering angle sensor for measuring steering position, a brake pressure sensor or brake pedal switch for measuring brake pressure, and an accelerator including a sensor for measuring accelerator position. The vehicle dynamic control system uses the inputs received from the velocity vector sensor and the driver controls to calculate a required speed of the wheel and send corresponding signals to the electric drive motor to command the calculated speed. The electric drive motor and drive electronics component operate to drive the wheel to the speed commanded by the vehicle dynamic control system. In some embodiments, the vehicle dynamic control system is configured to calculate effective tire circumference, tire pressure, tire slip rate, and tire slip angle.

Another embodiment of the invention is directed toward a computer program product comprising a non-transitory computer readable medium having computer executable program code embodied thereon, the computer executable program code configured to drive a wheel of a vehicle using a geared traction drive system including a driveshaft for transmitting power to the wheel, an electric drive motor for driving the driveshaft, a gear reduction component, and a drive electronics component, by performing the steps of: receiving sensor inputs from a plurality of sensors; calculating a required wheel speed; and sending appropriate signals to the electric drive motor to command the required wheel speed.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a vehicle dynamics control system (VDCS) of a four wheel, four quadrant electric drive system using one electric motor to drive each wheel. In some embodiments, the VDCS may be scaled to six or more wheels. In further embodiments, certain features of the VDCS may be implemented on two-wheel-drive vehicles. In the VDCS, drive or braking torque may be applied to each wheel independently. Even if the vehicle is decelerating, one or more wheels may have drive (acceleration) torque applied to the wheels as needed to achieve the desired vehicle dynamic, such as an increase or decrease in yaw rate.

According to embodiments of the invention, various parameters such as velocity, wheel speed and steering angle are measured during vehicle operation. In particular, velocity vectors are measured at the center of each axle. There are many means for measuring velocity vectors, including but not limited to: (i) accelerometers, (ii) laser velocimetry between the vehicle and the road surface, (iii) GPS, and (iv) image processing techniques using a digital camera to capture successive images of the road surface, then comparing images to detect feature movement. A cost effective method involves using accelerometers as the primary source, and canceling the drift using an image processing technique. These velocity vectors directly give speed and direction of each end of the vehicle; yaw rate may be derived from these.

Wheel speed is typically measured using pulse generators at each wheel, typically 40-80 pulses per revolution. In the VDCS, higher resolution speed signals are available from rotor position sensors in the electric drive motors, which are geared down to drive the wheels. If the VDCS is implemented in a two-wheel-drive application, the non-driven wheel speed sensors may be used to estimate vehicle velocity. Additionally the difference between the non-driven wheel speeds may be used to estimate vehicle yaw rate.

Steering angle is usually measured with an encoder mounted on the steering shaft. In the VDCS, there are position encoders coupled to the steering arms to measure the angles of both steering wheels, thus taking account of Ackerman steering geometry, or any other system where the angles of the steering wheels diverge as the steering wheel is turned away from center. Alternatively, the individual steering angles may be calculated from the steering wheel position and the known steering geometry.

Figure 1:
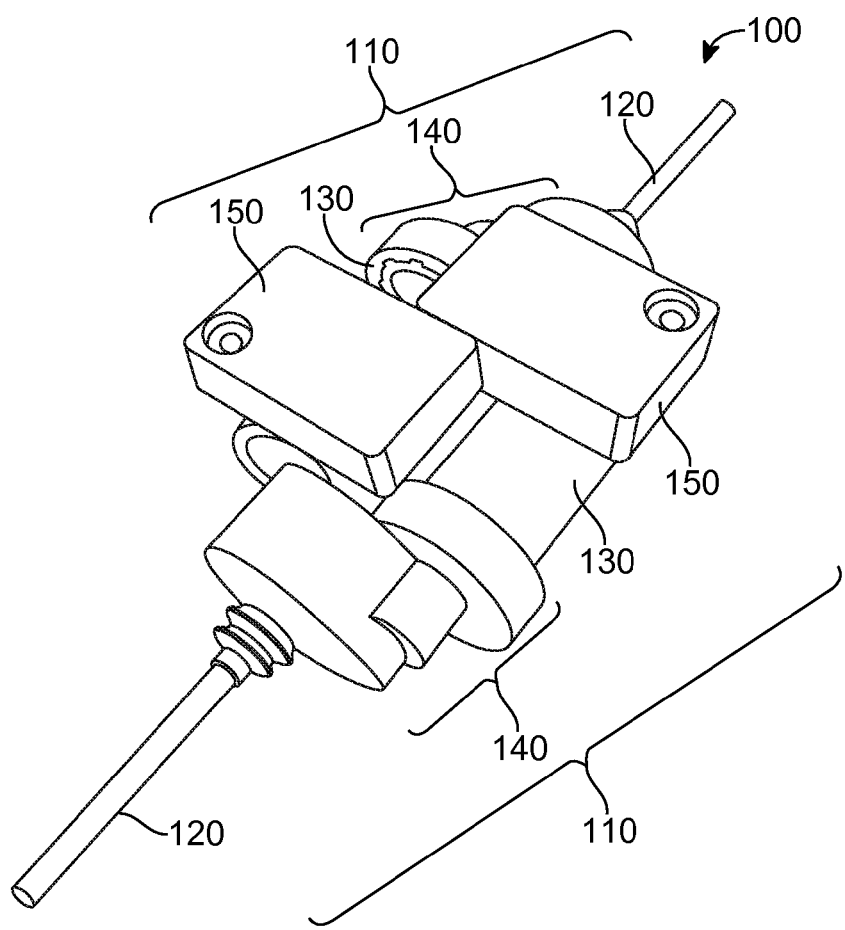
FIG. 1 is a perspective view illustrating a geared traction drive (GTD) system, in accordance with embodiments of the invention

FIG. 1 is a perspective view of a geared traction drive (GTD) system 100 in accordance with the principles of the invention. In particular the GTD system 100 as shown in FIG. 1, comprises a pair of GTDs 100, each including a driveshaft 120, an electric drive motor (EDM) 130 for driving the driveshaft 120, a 2-speed gear reduction component 140, and a drive electronics component 150. Each EDM 130 is configured to drive one wheel of a vehicle, e.g., an automobile. Specifically, the EDM 130 drives a wheel via driveshaft 120. In some automobile embodiments, the gear reduction component 140 can reduce the motor speed from a maximum of about 30,000 rpm to the 1800 rpm of the wheels, and increase the torque by the same factor. The drive electronics 150 takes the 320V DC from the battery, and makes 3-phase AC sine waves at variable voltage and variable frequency, in order to drive the motor at variable speed and torque. The driveshafts 120 transmit the power from the GTD 100 to the wheels. In some embodiments of the invention, the EDMs 130 drive the wheels directly without gear reduction.

With further reference to FIG. 1, the GTD system 100 includes a 2-speed design that allows high torque for acceleration to 60 mph, as well as high top speed. Four chassis-mounted GTDs deliver torque to all wheels with precise vehicle dynamics control including stability, regenerative braking, and traction control. The GTD system 100 acts as a native all wheel drive system with no differentials or right angle drives.

Figure 2:
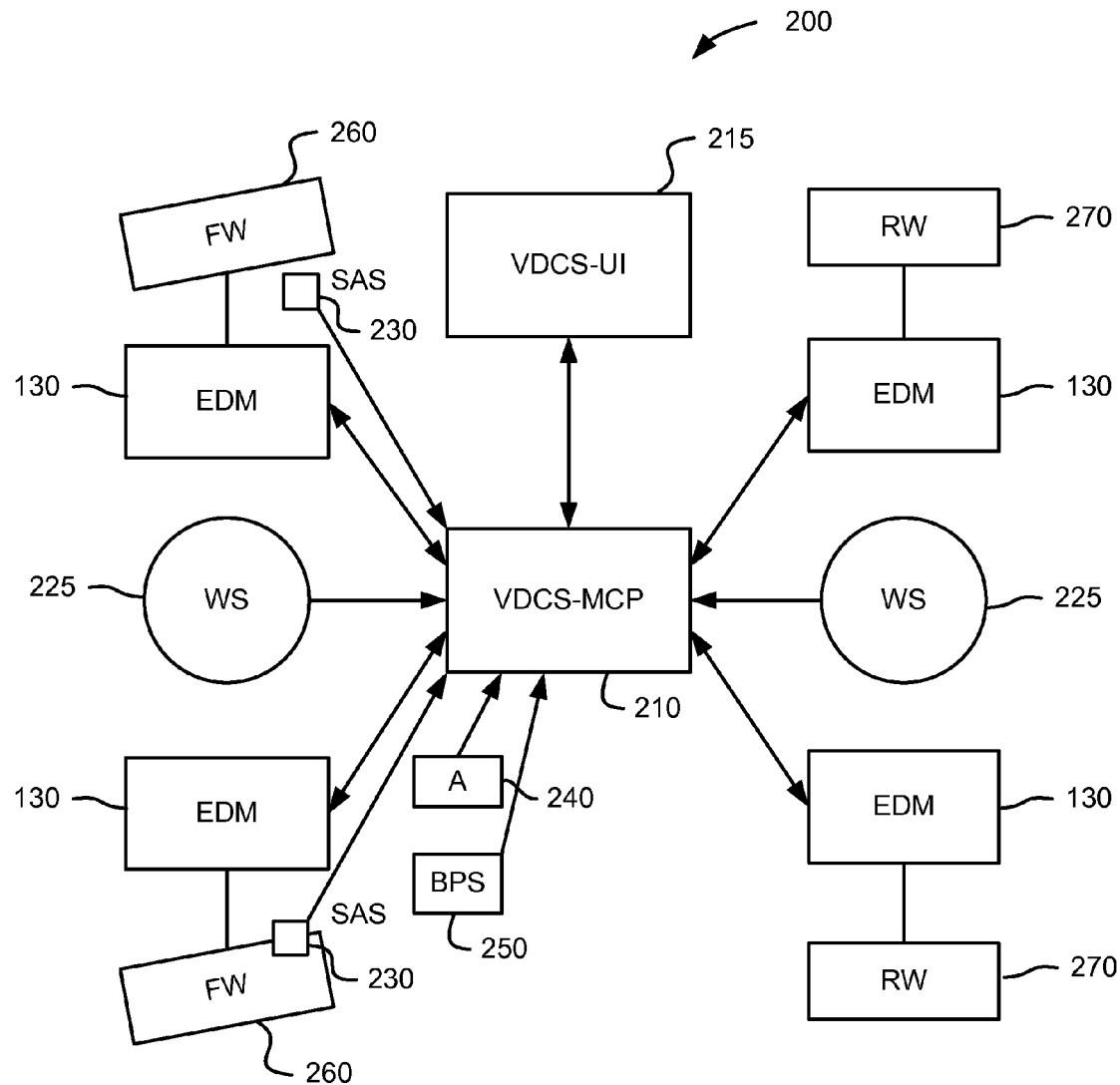
FIG. 2 is a diagram illustrating the functionality of a GTD system, in accordance with an embodiment of the invention

FIG. 2 is a diagram illustrating the functionality of a GTD system 100, in accordance with an embodiment of the invention. The system features a vehicle dynamic control system-main control processor (VDCS-MCP) 210, which may comprise a dedicated general purpose microcomputer with flash memory main storage, RAM, and communications ports to interface to various driver controls such as wheel speed sensors and steering position sensors. The VDCS 210 receives inputs from the driver controls and one or more velocity vector sensors (VVSs) 225, which measure the speed and direction of the vehicle over the roads. Each VVS 225 may comprise a module including a CCD camera chip and a lens, MEMS accelerometers, and a DSP for image processing. Alternative embodiments may employ laser velocimeters, GPS receivers, or radar/sonar based speed sensors instead of the CCD camera.

According to various embodiments of the invention, the driver controls may include steering angle sensors (SASs) 230 for measuring steering position and sending corresponding signals to the VDCS 210, a brake pressure sensor (BPS) 250 for measuring brake pressure and sending a corresponding signal to the VDCS 210, and an accelerator (A) 240 including a sensor for measuring accelerator position and sending a corresponding signal to the VDCS 210. Other embodiments feature the use of a brake pedal switch instead of the brake pressure sensor. The VDCS 210 uses the VVS data and the data received from driver controls to calculate required speeds of the front wheels (FWs) 260 and rear wheels (RWs) 270 and send corresponding signals to the EDMs 130 to command the calculated speeds. The EDMs 130 and drive electronics 150 operate to drive the wheels 260, 270 to the speeds commanded by the VDCS 210. One EDM 130 is provided for each wheel 260, 270 of the vehicle. Each EDM 130 also includes an integral motor speed sensor and the power electronics to drive the motor. The EDMs 130 also report the output shaft speed back to the VDCS 210, which may be used to determine actual wheel speed. A vehicle dynamic control system-user interface (VDCS-UI) 215 is provided to display relevant information to the driver. The user interface 215 may comprise a general purpose microcomputer with a LCD display, including touchscreen or dedicated pushbuttons.

According to some embodiments of the invention, the VDCS 210 includes a non-transitory computer readable medium having computer executable program code embodied thereon, the computer executable program code configured to receive sensors input, calculate required wheel speeds, and send appropriate signals to the EDMs 130 to command those speeds. Various computer executable programs may reside on the GTD system 100 including, but not limited to: (i) DSP processing code for the VVSs 225; (ii) a real-time operating system for the VDCS main control processor 210; and (iii) a main VDCS code. The main VDCS code receives input from all sensors and calculates friction coefficient (μ), slip rates and angles, velocity vectors and resultant wheel motor speed and torque commands.

According to embodiments of the invention, various additional parameters such as effective tire circumference, tire pressure, tire slip rate, and tire slip angle may be determined using calculations involving previously measured parameters. By way of example, the effective tire circumference is calculated from the wheel speed and the velocity vector for that axle, using measurements made when there is no torque applied nor acceleration measured (straight flat road at constant speed). Effective tire circumference may change with tire wear, tire replacement, and tire pressure changes.

In some embodiments, tire pressure may be inferred from the difference between the effective tire circumference and the nominal circumference, if the tire size is known by the VDCS. The loss of pressure in all tires simultaneously will be detected. This may be referred to as the "driving over the tire stakes" detection problem. As used herein, tire slip rate is the difference between (i) the rotational speed calculated from the vehicle measured velocity and tire circumference, and (ii) the rotational speed measured by the wheel or motor speed sensors. This parameter may be calculated directly. As used herein, tire slip angle is the difference between where the tire is "pointing" and its actual track. This parameter may be calculated from (i) the velocity vectors and the steering angle for the steered wheels, and (ii) the velocity vector and any preset "toe" angle in the suspension set up.

According to certain embodiments, bump steer and/or suspension compliance induced steer may be determined using suspension position sensors. In some embodiments, yaw rate may be calculated from the difference in velocity vectors from each axle. Vehicle mass may be calculated from the applied wheel torque (which is known from the motor control system) and the measured resulting acceleration. This calculation is most accurate when the measured slip rates and slip angles are low. Friction coefficient (μ) is calculated from the vehicle mass and measured total slip (slip angle plus slip rate) versus the applied torque. This calculation is most accurate at high values of total slip.

Cornering stiffness may be calculated from the vehicle mass, measured slip angles, steering angle and current vehicle turn radius or yaw rate, and is more accurate at high slip angles and vehicle velocity. In addition, the height of the center of gravity is calculated from the change in slip-rate versus applied torque relation during vehicle accelerations as the vehicle load distribution shifts between wheels.

As set forth above, most existing systems employ a form of exception-based closed-loop control, wherein the traction control, ABS, and stability control programs do not intervene until an anomaly is detected, such as a sudden change in wheel speed or yaw rate. At this point, the control system intervenes until the anomaly disappears. The VDCS of the invention includes a completely differently control strategy.

According to various embodiments of the invention, the VDCS interprets the driver's intent based upon the steering position, the accelerator position, and the brake pressure (or brake pedal switch) signals. It also knows the actual vehicle behavior from the measured velocity vectors. The VDCS directly controls the individual motors (one per wheel) to achieve the results that the driver demands, or if traction conditions or power and torque limits cannot support that, then the closest approximation that is possible.

For example, if the driver demands maximum acceleration, the VDCS drives all of the wheels at the optimum slip rate to achieve maximum traction. The optimum slip rate is a programmable factor, and is derived from the fact that tires will produce their maximum traction at a certain (low) slip rate. Exceeding this slip rate ("wheelspin") results in lower traction. Operating at lower than optimum slip rates means that less thrust is delivered (i.e., less torque is applied) than could be supported by the tires in the current traction conditions. Optimum slip rate can be preset, adjustable, or adaptive. The adaptive function would operate by varying the slip rate slightly above and below the current setpoint, and measuring the resulting acceleration, thereby determining the rate which maximizes acceleration. This value may be different for different vehicle loads, tires, tire pressures, and road surfaces.

The optimum slip rate is achieved by calculating the optimum wheel speed from the measured velocity vectors and the already calculated effective tire circumference, and then driving the motors to achieve that optimum wheel speed. This calculation is performed many times per second.

According to an aspect of the invention, the VDCS does not depend on the actual friction coefficient. For example, the vehicle can be accelerating at a maximum rate on a high μ surface (dry, sealed road) and then cross a patch of lower μ (e.g., a wet or oily patch) without wheel-spin, since the motors are being driving to the optimum slip rate speed already. In such a situation, the torque required will drop, but the speed will not change.

If the driver demanded acceleration is less than the maximum, then the slip rate will be lower. At small values of acceleration, the slip rate will be very small, and acceleration is controlled by the rate at which the calculated and commanded wheel speed is incremented. Similarly for braking using the electric motors as generators (i.e., regenerative braking, or "regen"), the wheel speeds are calculated and driven in the same way as for acceleration.

The accelerator pedal position is interpreted as exactly that, an acceleration demand, either positive (pedal depressed) or negative (pedal released, "engine braking"). The law of the accelerator pedal is arranged such that the zero torque command point moves downwards with increasing speed, mimicking the behavior of conventional systems. At zero speed, the zero torque point is with the pedal released; there is no dead zone. Any depression of the pedal results in forward motion (or reverse motion, if reverse is selected). But at 50% of maximum speed, the zero torque point is moved to, for example, 50% of the pedal travel. Releasing the pedal will cause deceleration through regenerative braking. This braking action will be stronger as the pedal is released further, and reach some adjustable but preset maximum value when the pedal is fully released. Alternatively, the VDCS may map an accelerator pedal position to a speed command. A vehicle acceleration command is then generated based on the difference between the current speed and the commanded speed.

Another aspect of the VDCS that is not found in existing systems entails the control of acceleration directly, not torque or speed. For example, if the preset maximum regen braking is set to 0.25 g the vehicle will decelerate at 0.25 g with the pedal fully released, regardless of speed or vehicle load, within the limits of available traction and system power and torque. A truck that is fully loaded will decelerate in the same way as if it were empty. More wheel torque is required to achieve this, but more traction is available because of the heavier load. This is particularly useful in embodiments wherein the VDCS is utilized only on the rear wheels of a truck.

In some embodiments of the invention, regen braking is integrated with friction braking: Specifically, the VDCS can be set up so that regen braking with the accelerator pedal released is sufficient for all non-emergency (and non-competition) braking events. The friction brakes can be used to hold the stationary vehicle on a slope, and if the regen system fails.

In cases where (for whatever reason) regen braking is not sufficient, the driver can press the brake pedal, thus engaging the foundation friction brakes in the usual way. In an all-wheel drive implementation, the VDCS can sense insufficient braking power through a brake pressure sensor or brake pedal switch, and proceed to increase the regen braking torque accordingly, but not so as to exceed the optimum tire slip rate. If the measured tire slip rate becomes too high, the VDCS will reduce regen braking torque, and even add drive torque to keep the tire slip rate in the optimum range. This performs a similar function to existing ABS systems, however yields significantly higher braking effectiveness and precision since the wheel speed is directly and continuously controlled to the optimal slip rate using braking or driving torque as necessary. According to some embodiments, a brake pressure limiter can be included as part of the VDCS, under VDCS control, to prevent wheel lockup in the case where the friction brakes cannot be overpowered by electric motor drive torque.

Yaw control using the VDCS will now be described. During operation, the VDCS calculates the individual wheel speeds required for the current vehicle speed (as measured by the velocity sensors) and steering position, and drives all of the wheels at those speeds. This has the effect of an active differential with torque vectoring. If the driver steers to the right, and for whatever reason the vehicle doesn't yaw to the right, the VDCS will apply up to maximum drive torque (or until the most effective tire slip rate is reached) to the left wheels to get their rotational speed up to what it would be if the vehicle were following the desired track. The right wheels will have less or even negative torque applied to get them to the correct speed, thereby creating a strong yaw moment to the right.

If the vehicle yaws too far to the right, the reverse will happen. In particular, the VDCS will apply a high positive torque on the right wheels, low or negative (braking) torque on the left wheels, and a left yaw moment. If the driver is also commanding acceleration or braking while turning, the VDCS also considers this in the calculation of target wheel speeds, and delivers the desired acceleration or braking within the limits of the available traction and torque/power. If traction limits are insufficient, the VDCS prioritizes steering demand over acceleration or braking.

Operation of VDCS traction control with regards to the available traction circle will now be described. Tires can produce a certain traction force under given load and μ conditions before the slip rate or slip angle becomes excessive. If this force is expressed as a vector, its limits describe a rough circle. The tire's traction can be used for acceleration, braking, or cornering. However, the vector sum of acceleration (or braking) and cornering cannot exceed the tire's limit. In other words, it can't go outside the circle. The VDCS manages the acceleration/braking torque per wheel so as not to get excessive slip rates/angles. If the driver already has the vehicle cornering at the optimum slip angle (highest cornering g), then the VDCS will not allow any acceleration or regen braking. As the driver unloads the steering, the VDCS allows more acceleration or braking torque, keeping the traction vector on the traction circle.

Slip angle limiting using the VDCS will now be described. In the absence of a limiting function, the vehicle can be commanded to yaw beyond the rate which gives the optimum tire slip angles. In this case, cornering g would decrease, the vehicle would describe a circle of greater radius, driving "sideways" and ultimately "spinning." The VDCS limits the rear (non-steered) wheel slip angle, but not the front (steered) wheels. This has the effect of inducing understeer at the traction limits, and preventing a spin. The mechanism is a modification of the yaw control. As the rear slip angle approaches the limit value, the VDCS reduces the differential speeds of the left-right wheels, creating a yaw moment against the turn. If necessary, it will even reverse the differential wheel speeds to prevent the optimal rear slip angle from being exceeded. Slip angle limits can be preset, driver adjustable, or adaptive. Adaptive limits can be determined by varying the slip angle slightly above and below the nominal max value, and measuring the resultant lateral acceleration.

Oversteer/Understeer balance using the VDCS will now be described. As used herein, "understeer" includes the situation where the front slip angles are greater than the rear slip angles. As the vehicle "pushes," it turns less than the driver demands. As used herein, "oversteer" includes the situation where the rear slip angles are greater than the front. In such cases, the vehicle is "loose" and turns more than the driver intends. Oversteer is unstable and undesirable in road vehicles. Indeed, for safety reasons, road vehicles are tuned to understeer under almost all conditions. Race cars are generally set up to be more neutral, and can oversteer under some conditions. Racing drivers compensate for this with quick steering corrections. The trade-off is that, in understeer, there is more available cornering traction than is being used. The rear tires are never operated at their optimum slip angle, and to ensure that the front slip angles are higher than the rear, something is generally done to the front suspension geometry to limit the traction available at the optimum slip angle (e.g., weight transfer, camber, toe-in, etc.). Accordingly, the vehicle cannot achieve the cornering performance that the tires could deliver if it was not set up to understeer.

In instances where understeer defines the vehicle's behavior, the understeer may be excessive under certain conditions. In the case of a mid- or rear-engine sports car, the center of the mass should be forward of the aerodynamic center to achieve high speed stability. However, this may be difficult to achieve within styling constraints. Some compensation can be achieved by tuning the suspension for understeer. But at low speeds, when the driver wants the vehicle to yaw quickly, the front tire traction must overcome the polar moment of the car, as well as accelerate it laterally. Accordingly, the neutral stability at high speeds becomes massive understeer at low speeds. Another example is an SUV designed to be stable and safe from rollover when loaded with a rearward center of mass and one rear tire deflated. Unloaded and with fully inflated rear tires the SUV will exhibit excessive understeer.

The VDCS of the invention can compensate for the above-identified problems using (i) the natural operation of the yaw control and slip rate limit mechanisms, and (ii) certain control algorithms discussed herein. The uncompensated values for differential wheel speeds when turning can be biased, so that the vehicle resists turning (understeer) or is eager to turn, thus canceling the understeer that results from, for example, suspension geometry. The VDCS can also add a temporary boost to yaw rate when the vehicle speed is low, and an extra boost if the steering wheel is turned quickly. This can compensate for high polar moment without adversely affecting high-speed stability. The slip angle limiter can have a speed-dependent limit value, increasing stability at higher speeds. Further, the understeer/oversteer balance and the dynamic compensation can be present, adjustable, or adaptive. One example of an adaptive understeer/oversteer balance is to modify the relation based on current vehicle loading conditions, height of the center of gravity, and dynamically calculated differences in tire cornering stiffness.

Motor torque and current loading using the VDCS will now be described. Any vehicle which contains more than one motor and no mechanical means of blending their output torque may encounter disturbances if one motor reaches a torque limit before the other(s). For example, in the one motor per wheel configuration, a torque limited motor at one wheel will lead to an unequal force distribution that leads to vehicle yaw disturbances. The VDCS can monitor each motor and modify overall motor commands as any individual motor approaches torque, current, temperature, or other physical limits. Additionally the VDCS can modify motor commands as the power requirements of all motors reaches the limit of the vehicle power supply (batteries, generator, etc).

Rollover prevention using the VDCS will now be described. The VDCS may continually monitor the vehicle state, including velocity, turn radius, mass, center of gravity height, and cornering coefficients to determine if any driver maneuver is likely to place the vehicle in danger of rollover. Additionally, the VDCS can continually modify individual wheel speed commands to apply differential torque as necessary to avoid rollover situations.

The VDCS can continually update its estimates of vehicle parameters such as vehicle mass, location of center of gravity, or changes in cornering coefficients (for example a flat tire) so that the amount of rollover prevention is modified as the vehicle becomes more or less likely to rollover.

Driver specific tuning using the VDCS will now be described. The VDCS can recognize different drivers and adapt its behavior to match these drivers. For example, one method of driver recognition is smart keys: keys with transponders, having unique codes. If the VDCS recognizes that a Valet Key is in use, it can limit vehicle speed, acceleration and slip angles to values very much smaller than normal. On the other hand, if it recognizes an Advanced Driver key, it can allow higher slip rates and slip angles, and change the understeer/oversteer balance, as well as allow a higher maximum speed. A Stunt Key can allow vehicle dynamics behavior such as spins on demand, even at high speeds, and from high reverse speeds. The allowed behavior may also entail cornering with extreme slip angles ("drifting"), and skid steer spin-on-the-spot if sufficient torque is available.

Driver performance calibration using the VDCS will now be described. Specifically, in some embodiments the VDCS can measure driver performance in some useful parameters, and can adapt its behavior to suit the driver. In further embodiments, the VDCS can measure smoothness, which is defined herein as the degree to which the driver makes smooth transitions from braking to cornering to accelerating. In additional embodiments, the VDCS can measure anticipation, which is defined herein as the degree to which the driver needs to use sudden braking. The VDCS, in certain embodiments, can also measure confidence, which is defined herein as the degree to which drivers use the cornering ability of their vehicle rather than braking and accelerating. In competition driving, the VDCS can measure how close to the traction circle the driver operates, and how smoothly. Real-time measurement of slip angles and slip rates enables this driver performance calibration.

In certain embodiments of the invention, the VDCS includes a user interface having various user feedback displays. Such displays may include, but are not limited to: (i) traction margin; (ii) traction circle; and (iii) measured $\mu$. Traction margin can be calculated from measured total slip angle (angle and rate). Alternatively, for low values of slip, the applied torque and steering angle is compared with most recent measurement of $\mu$. This a reading of currently "used" traction against a scale of available traction. It may be implemented as a tachometer-like display, where the redline represents the tire slip which gives maximum traction. Traction circle can be implemented on an LCD or similar display, showing the total slip vector (magnitude and direction) against a circle representing the optimal slip. Measured $\mu$ is the friction coefficient derived as described hereinabove.

Figure 3:
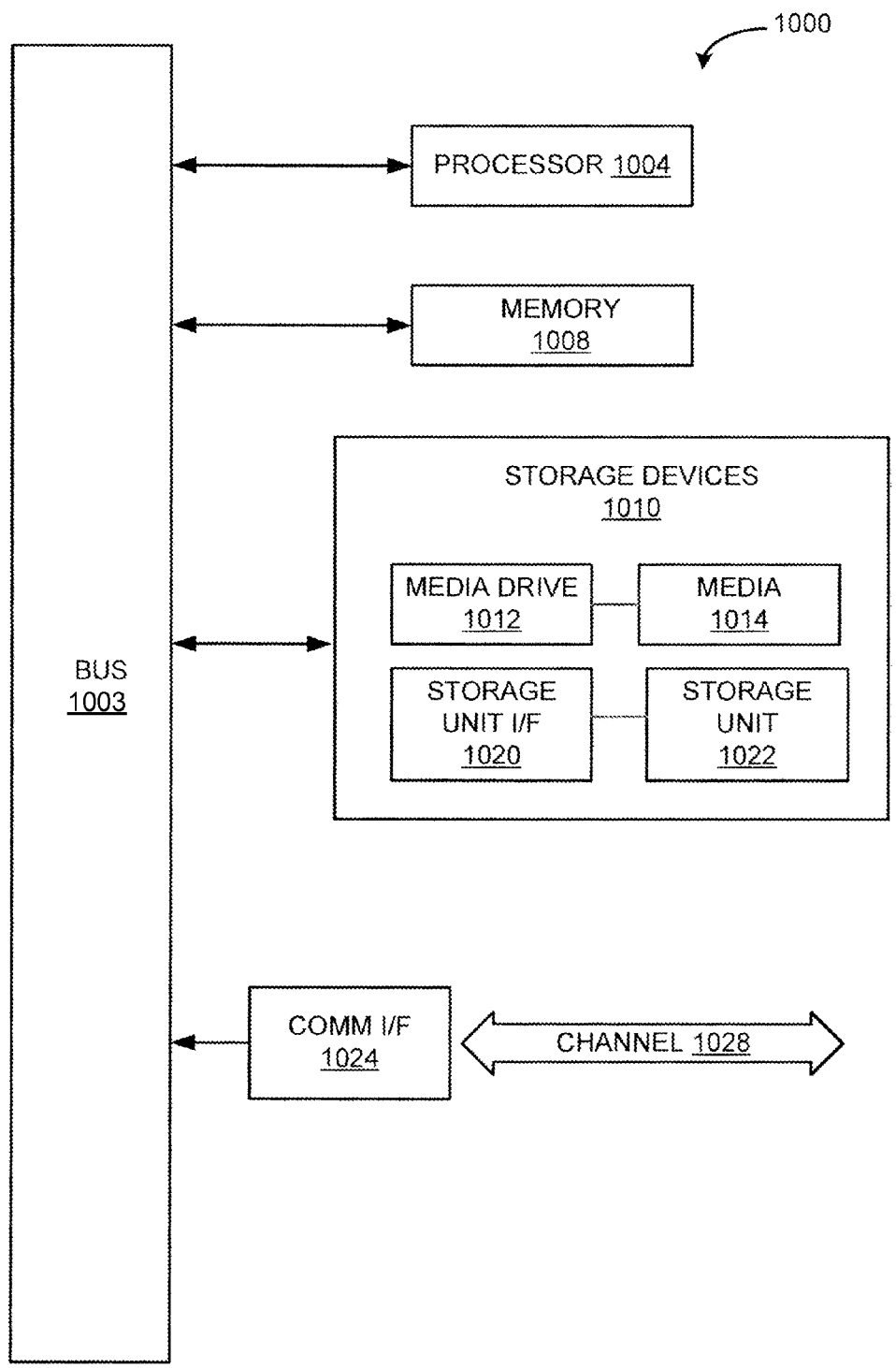
FIG. 3 is a diagram illustrating an example computing module for implementing various embodiments of the invention.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 1000. After reading this description, it will become apparent to a person skilled in the relevant art how to implement the invention using other computing modules or architectures.

Referring now to FIG. 3, computing module 1000 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1003, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1003 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD, DVD or Blu-ray drive (R or RW), or other removable or fixed media drive might be provided. Accordingly, storage media 1014 might include, for example, a hard disk, a floppy disk, magnetic tape, cartridge, optical disk, a CD, DVD or Blu-ray, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the faun of computer programs or other groupings). When executed, such instructions might enable the computing module 1000 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A vehicle dynamics control system, comprising:
a first motor electrically coupled to a first drive electronics module, the first motor coupled to a first wheel, and a second motor electrically coupled to a second electronics module, the second motor coupled to a second wheel; and
a main control processor, the main control processor configured to control the electric motors by transmitting speed commands to the drive electronics modules, wherein the transmitted speed commands are determined by:
receiving vehicle speed and direction data from at least one sensor,
receiving driver data from at least one driver input sensor,
generating first and second required wheel speeds from the driver data and the vehicle speed and direction data,
calculating first and second optimum wheel speeds, the calculated optimum wheel speeds being the speed at which each wheel can be driven to so as to not exceed a slip rate which achieves an optimal slip,
determining a first and second commanded wheel speed by limiting the first and second required wheel speeds to the optimum wheel speeds, and
transmitting the first and second commanded wheel speeds to the first and second drive electronics modules.

2. The vehicle dynamics control system of claim 1, wherein the main control processor includes a non-transitory computer readable medium having computer executable program code embodied thereon, the computer executable program code configured to receive the sensor inputs, calculate required wheel speed, and send appropriate signals to the electric drive motor to command the required wheel speed.

3. The vehicle dynamics control system of claim 1, wherein the main control processor includes a dedicated general purpose microcomputer with flash memory main storage, RAM, and communications ports to interface to the at least one driver in-put sensor.

4. The vehicle dynamics control system of claim 1, wherein the vehicle dynamics control system main control processor is configured to calculate effective tire circumference, tire pressure, vehicle mass and location of center of gravity, tire slip rate, and tire slip angle.

5. The vehicle dynamics control system of claim 1, wherein the first commanded wheel speed and the second commanded wheel speed are different when the vehicle is cornering.

6. The vehicle dynamics control system of claim 1, further including a third motor electrically coupled to a third electronics drive module, the third motor coupled to a third wheel, and a fourth motor electrically coupled to a fourth electronics drive module, the fourth motor coupled to a fourth wheel.

7. The vehicle dynamics control system of claim 6, wherein the main control processor is further configured to control the third and fourth electric motors by transmitting third and fourth speed commands to the third and fourth drive electronics modules, wherein the third and fourth speed commands are determined by:
receiving vehicle speed and direction data from at least one sensor, receiving driver data from at least one driver input sensor, generating third and fourth required wheel speeds from the driver data and the vehicle speed and direction data, calculating third and fourth optimum wheel speeds, the calculated optimum wheel speeds being the speed at which each wheel can be driven to so as to not exceed a slip rate which achieves an optimal slip, determining a third and fourth commanded wheel speed by limiting the third and fourth required wheel speeds to the optimum wheel speeds, and transmitting the third and fourth commanded wheel speeds to the third and fourth drive electronics modules.

8. The vehicle dynamics control system of claim 7, wherein the first, second, third and fourth commanded wheel speeds are different.

9. The vehicle dynamics control system of claim 7, wherein the first and third wheel commanded speeds are equal.

10. The vehicle dynamics control system of claim 7, wherein the second and fourth commanded wheel speeds are equal.

11. The vehicle dynamics control system of claim 7, wherein the first, second, third and fourth commanded wheel speeds are equal.

12. The vehicle dynamics control system of claim 7, wherein vehicle direction is further controlled by altering wheel speeds to achieve a desired directional change.

13. The vehicle dynamics control system of claim 1, wherein the driver input sensor is a steering angle sensor.

14. The vehicle dynamics control system of claim 13, further including a second driver input sensor, wherein the second driver input sensor is an accelerator position sensor.

15. The vehicle dynamics control system of claim 1, wherein the driver input sensor is an accelerator position sensor.

16. The vehicle dynamics control system of claim 1, wherein the vehicle speed and direction are measured using a velocity sensor.

17. The vehicle dynamics control system of claim 16, wherein the velocity sensor is a digital camera disposed perpendicular to a road surface.

18. The vehicle dynamics control system of claim 1, wherein the vehicle speed and direction are measured using two velocity sensors.

19. The vehicle dynamics control system of claim 18, wherein the velocity sensors are mounted at opposite ends of the vehicle.

20. The vehicle dynamics control system of claim 19, wherein the velocity sensors are digital cameras disposed perpendicular to the road surface.

21. The vehicle dynamics control system of claim 1, wherein the slip includes a slip rate and a slip angle the slip rate and slip angle being expressed as a vector sum.

22. The vehicle dynamics control system of claim 21, wherein the main control processor maintains the vehicle within a traction circle through the commanded wheel speeds, the traction circle consisting of a collection of points defined by the vector sum of the slip angle and slip rate defining a maximum traction force in each direction.

23. The vehicle dynamics control system of claim 21, wherein the main control processor prevents wheelspin through the commanded wheel speeds.

24. The vehicle dynamics control system of claim 1, wherein the driver input sensor is selected from a group consisting of a brake pressure sensor, a steering sensor, or an accelerator position sensor.

25. The vehicle dynamics control system of claim 1, further including a display electronically coupled to the main control processor, the display configured to display at least one of the following, vehicle speed, slip rate, slip angle, differential torque, traction circle calculation, steering angle, accelerator position, brake position, used traction vs. available traction, motor speed.

26. The vehicle dynamics control system of claim 1, further including a second driver input sensor, the second driver sensor including a unique driver identifier.

27. The vehicle dynamics control system of claim 26, wherein the unique driver identifier selects a unique program stored within the main control processor.

28. The vehicle dynamics control system of claim 27, wherein the unique program is a valet program, the valet program limiting the vehicle speed and acceleration.

29. The vehicle dynamics control system of claim 27, wherein the unique program is an advanced driver program, the advanced driver program altering one or more program parameter selected from the group consisting of: greater wheel slip, greater acceleration or greater torque application.

30. The vehicle dynamics control system of claim 1, wherein the main control processor prevents vehicle rollover by altering the first and second commanded wheel speeds.

31. A method for controlling vehicle dynamics, comprising:
receiving vehicle speed and direction data from at least one sensor on a vehicle;
receiving driver data from at least one driver input sensor;
generating, by at least one computer, a first and a second required wheel speed from the driver data and the vehicle speed and direction data;
calculating, by at least one computer, a first and a second optimum wheel speed, the calculated optimum wheel speed being the speed at which respectively a first and a second wheel can be driven to so as to not exceed a slip rate which achieves an optimal slip over a surface;
determining, by at least one computer, a first and a second commanded wheel speed by limiting the first and the second required wheel speed to respectively the first and the second calculated optimum wheel speed;
transmitting the first commanded wheel speed to a first electronic module coupled with a first motor, the first motor coupled to the first wheel; and
transmitting the second commanded wheel speed to a second electronic module coupled with a second motor, the second motor coupled with the second wheel.

32. The method of claim 31, wherein the first commanded wheel speed and the second commanded wheel speed are different when the vehicle is cornering.

33. The vehicle dynamics control system of claim 31, further comprising:
generating, by at least one computer, a third and a fourth required wheel speed from the driver data and the vehicle speed and direction data;
calculating, by at least one computer, a third and a fourth optimum wheel speeds, the third and the fourth calculated optimum wheel speed being the speed at which respectively a third wheel and a fourth wheel can be driven to so as to not exceed a slip rate which achieves an optimal slip over the surface, determining, by at least one computer, a third and a fourth commanded wheel speed by limiting the third and the fourth required wheel speed to respectively the third and the fourth optimum wheel speed; and
transmitting the third commanded wheel speed to a third electronic module coupled with a third motor, the third motor coupled to the third wheel; and
transmitting the fourth commanded wheel speed to a fourth electronic module coupled with a fourth motor, the fourth motor coupled with the fourth wheel.

34. The method of claim 33, wherein the first, second, third and fourth commanded wheel speeds are different.

35. The vehicle dynamics control system of claim 33, wherein the first and third wheel commanded speeds are equal.

36. The vehicle dynamics control system of claim 33, wherein the second and fourth commanded wheel speeds are equal.

37. The vehicle dynamics control system of claim 33, wherein the first, second, third and fourth commanded wheel speeds are equal.

38. The method of claim 31, wherein the slip includes a slip rate and a slip angle the slip rate and slip angle being expressed as a vector sum.

39. The method of claim 38, further comprises maintaining, through at least one computer, the vehicle within a traction circle through the commanded wheel speeds, the traction circle comprising a collection of points defined by the vector sum of the slip angle and slip rate defining a maximum traction force in each direction.

40. The vehicle dynamics control system of claim 38, further comprising preventing, by at least one processor, wheelspin through the commanded wheel speeds.

41. The method of claim 31, wherein the driver input sensor is selected from a group consisting of a brake pressure sensor, a steering sensor, or an accelerator position sensor.

* * * * *

UNITED STATES PATENT AND TRADEMARK OFFICE
CERTIFICATE OF CORRECTION

PATENT NO.         : 8,718,897 B2
APPLICATION NO.    : 13/071356
DATED              : May 6, 2014
INVENTOR(S)        : Ian Wright and Ryan Cash It is certified that error appears in the above-identified patent and that said Letters Patent is hereby corrected as shown below:

In the claims

Column 16, Line 4, Claim 33, "vehicle dynamics control system" should read -method- Column 16, Line 28, Claim 35, "vehicle dynamics control system" should read -method- Column 16, Line 32, Claim 36, "vehicle dynamics control system" should read -method- Column 16, Line 35, Claim 37, "vehicle dynamics control system" should read -method- Column 16, Line 47, Claim 40, "vehicle dynamics control system" should read -method- Signed and Sealed this
Twenty-eighth Day of June, 2016

Michelle K. Lee
*Director of the United States Patent and Trademark Office*